United States Patent [19]

Segota

[11] Patent Number: 5,718,539

[45] Date of Patent: Feb. 17, 1998

[54] BOUNDARY AIR/LAMINAR FLOW CONVEYING SYSTEM WITH AIR REDUCTION CONE

[75] Inventor: Darko Segota, Salt Lake City, Utah

[73] Assignee: BA/LF Holdings, L.C., Woodland, Utah

[21] Appl. No.: 558,004

[22] Filed: Nov. 13, 1995

Related U.S. Application Data

[63] Continuation-in-part of Ser. No. 446,054, May 19, 1995.

[51] Int. Cl.$^6$ ................................................. B65G 53/08
[52] U.S. Cl. ................................................................ 406/61
[58] Field of Search ............................. 406/56, 61, 144, 406/153

[56] References Cited

U.S. PATENT DOCUMENTS

| | | | |
|---|---|---|---|
| 321,573 | 7/1885 | Boschke | 406/144 |
| 337,388 | 3/1886 | Fernald et al. | 406/153 |
| 1,614,713 | 1/1927 | Caracristi | 406/61 |
| 2,315,079 | 3/1943 | Reeves . | |
| 3,377,107 | 4/1968 | Hodgson . | |
| 4,372,712 | 2/1983 | Powell et al. | 406/153 |
| 4,500,228 | 2/1985 | McDonald et al. . | |
| 4,711,607 | 12/1987 | Wynosky et al. . | |

FOREIGN PATENT DOCUMENTS

| | | | |
|---|---|---|---|
| 1172671 | 8/1984 | Canada . | |
| 0 094 811 | 11/1983 | European Pat. Off. . | |
| 0 099 653 | 2/1984 | European Pat. Off. . | |
| 613 056 | 4/1935 | Germany . | |
| 27 29 863 | 1/1978 | Germany . | |
| 92928 | 2/1922 | Switzerland | 406/56 |
| 537009 | 12/1976 | U.S.S.R. . | |

OTHER PUBLICATIONS

Study of Pneumatic Conveying Systems Utilizing Laminar Flow/Boundar Air Technology in Loading, Discharging or Transfer of Cargo on U.S. Bulk Carriers, U.S. Department of Transportation—Maritime Administration, Contract No. DTMA91–83–C–30058, Report No. 84052, Oct. 30, 1984.

*Primary Examiner*—Gary C. Hoge
*Attorney, Agent, or Firm*—Thorpe North & Western, LLP

[57] ABSTRACT

A system for conveying liquid or particulate material from a first location to a second location. The system is utilized in combination with an elongate barrel having a discharge end. A plenum chamber is placed around the barrel. A frusto-conical air reduction cone is contained within the plenum chamber. The reduction cone has a narrower open end which is coupled to an interior front wall of the plenum chamber so as to surround the auger barrel. The narrower open end surrounds and communicates with a port in the front wall through which the auger barrel extends. The port and the auger barrel thus form an annular constriction therebetween. Pressurized air is injected into the plenum chamber which is drawn into the cone and passes through the annular constriction in the form of a continuous annular stream of pressurized air enveloping the discharge end of the barrel. The stream of air carries any material discharged from the barrel along a movement path.

33 Claims, 1 Drawing Sheet

BOUNDARY AIR/LAMINAR FLOW CONVEYING SYSTEM WITH AIR REDUCTION CONE

This is a continuation-in-part of U.S. patent application Ser. No. 08/446,054 filed May 19, 1995 entitled "BOUNDARY AIR/LAMINAR FLOW CONVEYING SYSTEM".

BACKGROUND OF THE INVENTION

1. The Field of the Invention

The present invention relates generally to materials handling and/or classifying equipment, and more particularly to a pressurized boundary air injection system utilizing an air reduction cone.

2. The Background Art

Pneumatic conveying systems have been in use for many years for transporting various particulate materials, such as pulverized coal, portland cement, grain, pulverized ore, etc., through pipelines and other conduits. Such systems typically include a motor driven auger conveyor rotatably mounted within an auger barrel. A gravity-fed hopper supplies particulate material to the auger through an opening in the barrel, and the auger moves the material through the barrel. A mixing chamber is situated at the discharge end of the barrel where one or more jets of pressurized air or other gas is combined with the material ejected by the auger conveyor. The material is propelled by the pressurized gas through a conduit connected to the mixing chamber.

Conventional pneumatic conveying systems with auger conveyor sections have the drawback that the mixing of pressurized gas with the particulate material in the mixing chamber produces considerable turbulence in the mixture transported through the conduit. Such turbulence is undesirable because it increases contact of the material with the conduit walls during transport, which causes frictional and wear losses in the conveying system. Such frictional losses necessitate a higher rate of energy for transporting the material, and significantly reduce the distance over which the material can be conveyed. When the material being transported is abrasive or corrosive, contact of such material with the conduit walls increases wearing of the walls and reduces the useful life of the conduit.

Pneumatic conveying systems for particulate materials have also been devised in which the mixing of material with gas takes place in a venturi pipe through which pressurized gas flows. By introducing the particulate material into the relatively high velocity gas flow in the constriction or throat of the venturi pipe, mixing of the material with the gas occurs with little turbulence. The resulting mixture may be propelled through the conduit with reduced frictional loss and less wear of the conduit walls.

In conventional venturi conveying systems, the particulate material to be mixed with the gas is supplied to the venturi pipe by a chute which injects the material into the pipe near the constriction. A vacuum (subatmospheric pressure) created by the high velocity gas flow in the constriction operates to draw the material from the chute into the venturi pipe. Because the material being transported does not always flow freely in the chute, the transport rate in a conventional venturi conveying system is difficult to control. The transport rate is further subject to variation caused by property differences in the materials being conveyed, such as density, moisture content, particle size, etc. Moreover, a conventional venturi conveying system may not provide a satisfactory material-to-air conveyance ratio for materials that are not sufficiently free flowing in the chute to allow the negative pressure in the venturi pipe to draw such materials from the chute at an adequate rate.

One attempt to improve the conventional venturi conveying systems is described in U.S. Pat. No. 4,711,607 (issued on Dec. 8, 1987 to Wynosky et al.). Because the transport rate through the auger portion of the system is difficult to control, the patent teaches the use of special high pressure jet nozzles in addition to the venturi piping to prevent blow back and product plugs from occurring. The Wynosky patent also teaches sensors for determining the air pressure difference between an air plenum chamber surrounding the auger barrel and the conduit at the end of the venturi restriction, so as to regulate the product flow through the auger and into the venturi mixing chamber by means of a variable speed motor driving the auger. The system taught in the Wynosky patent suffers from sever mechanical difficulties related to product blockage and blow back and an inadequate and inconsistent flow rate.

Therefore, the conventional auger conveyor systems, the conventional venturi conveying systems, and the venturi systems having adjustable venturi parts and air jet nozzles are subject to the problem of "blowback", which occurs when there is a blockage in the conduit or in the barrel. The blockage results in excessive pressure in the conduit and produces an undesirable back flow of gas and product in the hopper of the auger conveyor system and in the chute or hopper of the venturi conveying system. The conventional systems are also limited because they are only useable to transport particulate materials but not liquids.

Prior attempts to solve the problem of backflow include the use of a flapper valve or an air lock of the auger barrel or in the chute of the venturi system to prevent back flow of gasses and product when the pressure in the conduit becomes excessively high. Such mechanical devices are subject to binding, clogging and wear from contact with abrasive or corrosive materials and therefore require substantial maintenance.

Further problems with the prior art devices include turbulence produced in the plenum chamber which feeds air into the product conduit. Prior art attempts to reduce turbulence have included lengthening the plenum chamber, which necessarily requires a longer cantilevered auger.

OBJECTS AND SUMMARY OF THE INVENTION

It is therefore an object of the present invention to provide a system for utilizing gaseous flow to convey either liquids, or particulate material, or both.

It is a further object of the invention to provide such a system which minimizes turbulence in the plenum chamber without increasing the axial length thereof.

It is another object of the invention to provide such a system capable of continuously transporting the material at a constant rate under satisfactory air-to-material ratios and with minimized turbulence, for a wide range of materials.

It is an additional object of the invention to provide such a system which provides a laminar boundary layer to reduce friction loss and wear on the conduit.

It is still another object of the invention to provide such a system which inhibits backflow.

It is yet another object of the invention to provide such a system which produces subatmospheric pressure in the product conduit.

The above objects and others not specifically recited are realized in a specific illustrative embodiment of a system for conveying liquid or particulate material from a first location to a second location. The system is utilized in combination with an elongate barrel having a discharge end. A plenum chamber is placed around the barrel. A frustoconical air reduction cone is contained within the plenum chamber. The reduction cone has a narrower open end which is coupled to an interior front wall of the plenum chamber so as to surround the auger barrel. The narrower open end surrounds and communicates with a port in the front wall through which the auger barrel extends. The port and the auger barrel thus form an annular constriction therebetween. Pressurized air is injected into the plenum chamber which is drawn into the cone and passes through the annular constriction in the form of a continuous annular stream of pressurized air enveloping the discharge end of the barrel. The steam of air carries any material discharged from the barrel along a movement path.

Additional objects and advantages of the invention will be set forth in the description which follows, and in part will be apparent from the description, or may be learned by the practice of the invention. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawing in which is shown a side, cross-sectional view of a material conveying system made in accordance with the principles of the present invention.

DETAILED DESCRIPTION

Figure 1:
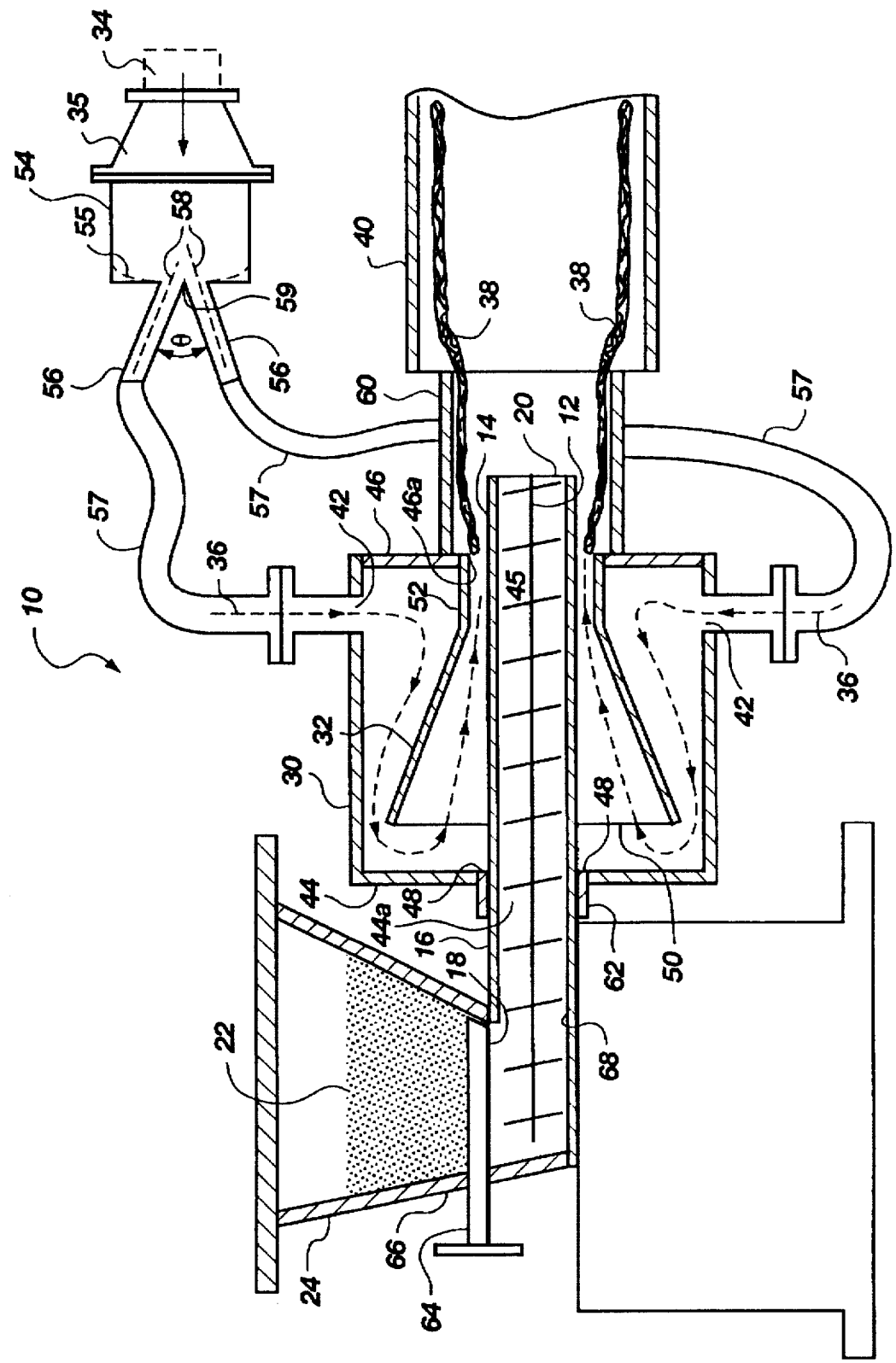

For the purposes of promoting an understanding of the principles in accordance with the invention, reference will now be made to the embodiments illustrated in the drawing and specific language will be used to describe the same. It will nevertheless be understood that no limitation of the scope of the invention is thereby intended. Any alterations and further modifications of the illustrated apparatus, and any additional applications of the principles of the invention as illustrated herein, which would normally occur to one skilled in the relevant art and possessed of this disclosure, are to be considered within the scope of the invention claimed.

Referring now to the drawing, a preferred embodiment in accordance with the present invention is illustrated as a material conveying system, generally designated at 10. The system 10 may be optionally utilized in combination with a cantilevered auger 12 rotatably disposed within an elongate barrel 14. The barrel 12 includes cylindrical side walls 16 and a discharge end 20. The side walls 16 include a receiving opening 18 formed therein for receiving material 22 from a hopper 24 which is preferably funnel-shaped. The auger 12 is driven in any suitable manner known to those skilled in the art, such as by a motor (not shown) which rotates the auger 12, causing the auger to convey the particulate materials along the barrel 14 and out the discharge end 20. As explained in more detail below, a subatmospheric pressure is produced in a following transport conduit 40 which draws the material 22 forwardly. As such, the auger 12 is optional and the material 22 can be either liquid or particulate.

The system 10 includes a plenum chamber means 30 having a frustoconical air reduction cone 32 contained therein. In operation, pressurized air is injected into the plenum chamber 30 by a pressurized air supply 34. The air flows along an air movement path 36 and becomes formed into a continuous annular stream 38 of pressurized air surrounding the barrel 14 and enveloping the discharge end 20. The stream 38 of air operates to carry the material 22 discharged from the discharge end 20 of the barrel 14 through the transport conduit 40. Because the air is pressurized and passed through the narrow constriction of the cone 32 and into the larger area of the conduit 40, a pressure is produced within the conduit which is lower than the pressure in the barrel 14. This lower conduit pressure helps draw the material 22 from the barrel 14 and inhibits blowback from occurring, the term "blowback" being readily known by those of ordinary skill in the art.

The effect of the continuous annular stream 38 of pressurized air is to lift the material 22 after it is discharged from the discharge end 20 of the barrel 14, and to constitute a continuous laminar boundary layer of gas which lines the transport conduit 40. In the absence of the air stream 38, the material 22 would tend to fall under the influence of gravity immediately after discharge from the barrel end 20, but the annular stream 38 tends to lift and encapsulate the material to enhance transport thereof through the transport conduit 40. The substantially continuous boundary layer of gas in the form of the air stream 38 against the interior surface of the transport conduit 40 tends to repel the particulate material 22 from contacting the walls of the transport conduit.

The plenum chamber 30 has at least one, and preferably two, air receiving openings 42 for receiving pressurized air from the air supply means 34. The plenum chamber 30 further includes first and second opposing end walls 44 and 46 and first and second ports 44a and 46a formed in the first and second end walls, respectively. The first port 44a is dimensioned to enable sealed passage of the barrel 14 therethrough, in that the interface 48 between the barrel 14 and the perimeter edge of the first port 44a would be either a firm engagement or a close enough abutment to enable a seal to be made at that interface.

The frustoconical air reduction cone 32 has an open wider end 50, and an open narrower end 52 coupled to the second end wall 46 so as to surround and communicate with the second port 46a. The cone 32 is positioned to enable passage of the barrel 14 through the first port 44a and into the wider end 50 such that the second port 46a comprises substantially the only unclosed opening in the plenum chamber 30 other than the air receiving openings 42. The term "unclosed opening" as used herein refers to some opening which has not been blocked such as second port 46a, as opposed to the first port 44a which is blocked by the sealed contact with the barrel 14. The discharge end 20 of the barrel preferably extends through and protrudes from the second port 46a, although such is not required. The second opening 46a opens into a larger space and thereby draws the pressurized air through the cone 32 into the continuous annular stream of pressurized air 38 surrounding the barrel 14 and discharge end 20. The stream 38 passes from the second port 46a into a movement path such that any material discharged from the discharge end 20, whether liquid or particulate is carried by the enveloping stream 38 of air along the movement path.

The second port 46a is larger in diameter than the barrel 14 to enable passage of the barrel therethrough such that the barrel and second port form an annular constriction space 45 therebetween. Similarly, the reduction cone 32 and the barrel 14 form an annular constriction space therebetween having a frustoconical outer surface bounded by the cone 32. The second end wall 46 of the plenum chamber 30 includes opposing interior and exterior surfaces as shown. The transport conduit 40 is coupled to the exterior surface of the second end wall 46 so as to surround and communicate with the second barrel port 46a for receiving the stream 38 of pressurized air thereinto. The conduit 40 may be coupled to the end wall 46 directly, or by an intercoupling connector 60 as shown. Also optionally, a substantially cylindrical auger barrel holder 62 may be coupled to the exterior surface of the first end wall 44 so as to surround and communicate with the first barrel port 44a and extend outwardly therefrom.

The transport conduit 40 is sufficiently larger in cross-sectional area than the annular constriction space 45 formed at second port 46a such that a lower pressure is produced in the transport conduit than in the barrel 14 when the stream of pressurized air 38 passes into the transport conduit. Preferably, the narrower end 52 of the reduction cone 32 is sufficiently larger than the discharge end 20 of the barrel 14 to enable the discharge end to protrude therefrom. Applicant has found that slidably adjusting the distance by which the discharge end 20 protrudes is effective in controlling the action of the material 22 as it is discharged from the end 20. For example, if the discharge movement is steeper than desired, the user may slidably adjust the plenum chamber 30 accordingly to modify the protrusion distance of the discharge end 20 from the second port 46a until a desirable discharge movement of the material 22 is achieved.

The air supply ports 42 are preferably closer to the second end wall 46 than the first end wall 44. This has the effect of lengthening the movement path 36 within the plenum chamber 30 without increasing the axial length of the plenum chamber itself, because the air must move along a U-shaped turnabout path as shown by the dashed movement sequence. The open wider end 50 of the reduction cone faces and is spaced apart from the first end wall 44 of the plenum chamber by a distance sufficient to enable the pressurized air to move from the air supply means 34 along the movement path 36 which extends sequentially from the air supply ports 42 over the exterior surface of the reduction cone 32 and into the open wider end 50 of the cone so as to pass through the cone and out of the narrower end 52 of the cone. Applicant has discovered that utilization of two air supply ports 42 instead of just one causes the pressurized air to converge quickly to fill the plenum chamber 30 with a minimized degree of turbulence. The two air supply ports 42 are formed in the sidewalls at substantially opposing locations so that the injected air from both ports will converge and counter act one another in a symmetrical manner, thereby reducing turbulence.

The system 10 preferably comprises an accumulation chamber 54 for accumulating pressurized air therein from the air supply means 34. The air supply means 34 is intercoupled in fluid communication with the accumulation chamber 54, preferably by a connector 35. Two air supply conduits 56 are coupled to the accumulation chamber 54 in fluidic communication therewith at points of attachment. The air supply conduits 56 are respectively attachable into communication with the two air supply ports 42 formed in the sidewalls of the plenum chamber means as shown schematically in the drawing by connecting tubes 57. The two air supply conduits 56 respectively define axes 58 at their points of attachment which form an angle θ with one another within a range of twenty degrees to forty degrees. The angle θ is preferably approximately thirty degrees. The combination of the accumulation chamber 54 and the thirty-degree spaced conduits 56 operates to preset the airflow in a consistent flow pattern, and prevent undesirable surge or turbulence in the air flow.

The accumulation chamber 54 preferably comprises a front concave interior surface 55. The concave structure of this interior surface 55 operates to reduce turbulence and otherwise conform the air flow into a stable, continuous flow pattern. The air supply conduits 56 preferably attach into the interior surface 55 in a side-by-side orientation, such that the exterior surfaces of the conduit 56 are substantially contiguous at a contact corner 59 between the conduits at their points of attachment to the accumulation chamber 54.

It is to be understood that the principles of the present invention cover many alternative embodiments of the reduction cone 32. For example, the cone 32 does not have to reside within a plenum chamber 30 as shown, but may be provided with pressurized air in any suitable manner. Many of the advantages of the invention accrue simply from placing a reduction cone to surround an auger barrel, with the discharge end 20 of the barrel protruding outwardly from the narrower end of the cone into a subsequent larger channel such as the connecting member 60 or the transport conduit 40. If the subsequent channel is large enough, then the problems of blowback inherent in the prior art systems are avoided because the lowest pressure is thereby produced downstream from the barrel 14. As such, there is no opportunity for blowback to occur simply because the lowest pressure occurs downstream, combined with the advantages of a slidably tunable cone 32 relative to the position of the discharge end 20. The narrower end 52 of the reduction cone 32 may comprise a substantially uniform cylindrical member as shown.

In accordance with the principles of the present invention as described above, a preferred method for producing a stream of air and conveying material within said stream of air comprises the steps of:

(a) placing the material into a barrel having a discharge end and transporting the material through the barrel toward and through the discharge end;

(b) sliding a plenum chamber containing an air reduction cone and having first and second barrel ports onto the barrel such that said barrel extends through at least the first barrel port and into the air reduction cone, wherein said air reduction cone includes a first open end and a second narrower open end which is coupled to the plenum chamber so as to surround and communicate with the second auger barrel port;

(c) injecting pressurized air into the plenum chamber at a pressure sufficient to convey the air along an air movement path extending into and through the reduction cone and out of the narrower open end of the cone to enable the cone to form the air into a continuous annular stream of pressurized air surrounding the barrel; and (d) positioning the narrower open end of the reduction cone sufficiently close to the discharge end of the barrel to cause the stream of the air to envelop said discharge end and carry material discharged from said discharge end along the air movement path.

The method set forth above may be enhanced in one or more of the following ways. For example, step (a) may further comprise feeding particulate material into an auger barrel and rotating an auger contained within the auger barrel so as to transport the material through the auger barrel toward and through the discharge end.

The method may further comprise the step of:

(e) placing a first open end of a transport conduit into communication with the second auger barrel port such that the stream of air is received thereinto, said transport conduit being sufficiently larger in diameter than the narrower open end of the reduction cone to cause a reduction in the pressure of the air stream when it is received in said transport conduit. This step (e) may be enhanced by selecting the transport conduit to be sufficiently larger in cross-sectional area than an annular constriction space formed between the reduction cone and the barrel such that subatmospheric pressure is produced in said transport conduit when the stream of pressurized air passes thereinto.

The method may additional comprise the step of:

(f) intercoupling the transport conduit and the plenum chamber with a substantially cylindrical connecting member such that said connecting member surrounds and communicates with the second auger barrel port and extends outwardly therefrom into contact with the transport conduit, wherein said connecting member is sufficiently larger in diameter than the narrower open end of the reduction cone to cause a first reduction in the pressure of the air stream and wherein the transport conduit is sufficiently larger in diameter than the connecting member to cause a second reduction in the pressure of the air.

The method may further comprise the step of:

(g) slidably adjusting the position of the plenum chamber relative to the discharge end of the barrel. This step (g) may be augmented by observing discharge movement of the material from the discharge end of the barrel, and slidably adjusting the position of the plenum chamber relative to the discharge end of the barrel if said discharge movement is steeper than desired.

It is to be understood that blockage may occur if the material 22 is permitted to enter the receiving opening 18 too quickly. A valve means 64, such as a gate valve or other suitable valve, can be disposed in a throat 66 of the hopper 24 for selectively increasing and reducing the flow of the material into the barrel to prevent such blockages from developing.

The pressurized air supply means 34 may comprise any blower means as known in the art to inject pressurized fluid, such as gas, into the plenum chamber 30. It is noted that relevant pump sizes associated with the air supply means 34 are preferably determined by the outside diameter of the auger 12, such as a pump sized between 1 inch and 24 inches of pressure as known in the art.

The auger 12, when included, can be sized and configured in accordance with the inside diameter of the barrel 14 so as to leave an annular passage or clearance 68 between the auger 12 and the inner surface of the barrel 14. The annular clearance 68 and the axial distance between the auger flights are preferably variable in size depending on the size of the particulate material to be conveyed. Wear on the auger 12 and the side walls of the barrel 14 is reduced as a result of the annular clearance 68. Certain types of particulate material 22 assist the process by becoming packed between the auger 12 and the side walls of the barrel 14, thereby isolating the side walls. Thus, a portion of the particulate material 22 being conveyed acts as a boundary plate over which the rest of the particulate material moves.

The particulate material 22 to be transported by the conveying system 10 is thus supplied by the vertically disposed, preferably funnel-shaped hopper 24. Particulate material 22 contained in the hopper 24 drops onto the auger 12 through the receiving opening 18 formed in the barrel 14. The auger 12 is driven to rotate in a direction which causes the flights of the auger to push the particulate material toward the discharge end 20 of the barrel 14. The material is thereby ejected from the discharge end at a rate and velocity determined by the rotational speed of the auger and the pitch of the flights. The rotational speed of the auger 12 has been found to be advantageous in the range of 1800 to 3600 r.p.m.

The material particles 22 are accelerated into the transport conduit 40 in such a manner that the stream of air 38 causes the larger and denser particles to converge towards the center of the airstream, thus allowing for particle separation and concentration of such particles. When the material 22 is propelled through the transport conduit 40, contact of the material with the conduit walls is substantially inhibited and is quite minimal, due to the continuous annular stream 38 of pressurized air.

The above-described system 10 in accordance with the present invention is capable of continuously transporting particulate materials having random particle sizes up to particle dimensions equal to the distance between the auger flights, said distance being preferably one inch or more. A typical, but not required, air-to-material conveying ratio is 10% to 25% solids and a corresponding 90% to 75% gases. If desired to auger motor (not shown) may be a variable speed motor operably attached to the auger 12 for rotating the auger to thereby enable a user to adjust the rotational velocity of the auger so as to enhance transport of the particulate material 22 by the auger.

The phrase "disposed in communication" as used herein shall not be limited to an interpretation that a first element is directly connected to a second element. The phrase "frustoconical section" as used herein shall refer broadly to objects having a frustoconical shape, including objects having a frustoconical portion which merges into another portion having some other shape such as the optional cylindrical narrower end 52 as shown in the drawing.

Those skilled in the art will appreciate that the scope of the present invention encompasses many combinations and a broad spectrum of features and structures equivalent to those specifically discussed herein. The principles of the invention may thus be used in any setting requiring the advantages thereof. Those having ordinary skill in the field of this invention will appreciate the advantages of the invention and its application to a wide variety of uses, and that objectives stated above are advantageously achieved by the present invention. For example, the conveying system 10 may be used with or without the auger 12, such as in the form of augerless pump action produced by subatmospheric pressure created within the transport conduit 40. The conveying system 10 may be used to transport liquid or particulates, or a mixture of both.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. An air conveying apparatus, useable in combination with a pressurized air supply means and an elongate barrel having a discharge end, as part of a material conveying system, said apparatus comprising:

a plenum chamber having at least one air receiving opening for receiving pressurized air from the air supply means, said plenum chamber comprising first and second opposing end walls and having first and second ports formed in the first and second end walls, respectively, said first port being dimensioned to enable sealed passage of the barrel therethrough; and a frustoconical air reduction cone disposed in the plenum chamber, said cone having an open wider end, and an open narrower end coupled to the second end wall so as to surround and communicate with said second port, said cone being positioned to enable passage of the barrel through the first port and into the wider end of said cone such that the second port comprises an unclosed opening large enough to draw the pressurized air through the cone into a continuous annular stream of pressurized air surrounding the barrel and discharge end and passing from said second port into an air movement path such that material discharged from said discharge end is carried by the enveloping stream of air along said air movement path.

2. The apparatus as defined in claim 1, wherein the second port is larger in diameter than the barrel to enable passage of said barrel through said second port such that said barrel and second port form an annular constriction space therebetween.

3. The apparatus as defined in claim 1, wherein the reduction cone and the barrel form an annular constriction space therebetween when the barrel extends into the reduction cone and wherein the second end wall of the plenum chamber includes opposing interior and exterior surfaces, said apparatus further comprising a transport conduit coupled to the exterior surface of said second end wall so as to surround and communicate with the second barrel port for receiving the stream of pressurized air thereinto, said transport conduit being sufficiently larger in cross-sectional area than the annular constriction space such that a lower pressure is produced in said transport conduit which is lower than the pressure in the barrel when the stream of pressurized air passes into said transport conduit.

4. The apparatus as defined in claim 3, wherein the lower pressure produced in the transport conduit is a subatmospheric pressure.

5. The apparatus as defined in claim 1, wherein the apparatus is useable in combination with a transport conduit, wherein the second end wall of the plenum chamber includes opposing interior and exterior surfaces, said apparatus further comprising a substantially cylindrical connecting member having first and second open ends and being coupled at its first end to the exterior surface of said second end wall so as to surround and communicate with the second barrel port for receiving the stream of pressurized air thereinto, the second end of said connecting member being a free end configured for attachment and communication with the transport conduit, wherein said connecting member is sufficiently larger in diameter than the narrower open end of the reduction cone to cause a first reduction in the pressure of the air stream and wherein the connecting member is sufficiently smaller in diameter than the transport conduit to cause a second reduction in the pressure of the air stream.

6. The apparatus as defined in claim 1, wherein said apparatus is useable in combination with a rotational auger contained within an auger barrel for transporting particulate material through the barrel and into the enveloping stream of air for conveyance along the air movement path.

7. The apparatus as defined in claim 1, wherein the narrower end of the reduction cone is sufficiently larger than the discharge end of the auger barrel to enable said discharge end to protrude from said narrower end.

8. The apparatus as defined in claim 1, wherein the reduction cone has an exterior surface and wherein the plenum chamber includes at least one air supply port formed therein at a location which is closer to the second end wall than the first end wall, and wherein the open wider end of the reduction cone faces and is spaced apart from the first end wall of the plenum chamber by a distance sufficient to enable the pressurized air to move from the air supply means along a movement path which extends sequentially from the air supply port over the exterior surface of the reduction cone and into the open wider end of the cone so as to pass through the cone and out of the narrower end of the cone.

9. The apparatus as defined in claim 1, wherein the plenum chamber includes two air supply ports formed in the sidewalls at substantially opposing locations which are closer to the second end wall than the first end wall.

10. The apparatus as defined in claim 9, further comprising:
an accumulation chamber for accumulating pressurized air therein from the air supply means;
two air supply conduits coupled to the accumulation chamber at points of attachment therewith and being disposed in fluidic communication therewith, said air supply conduits being respectively attachable into communication with the two air supply ports formed in the sidewalls of the plenum chamber.

11. The apparatus as defined in claim 10, wherein the two air supply conduits respectively define axes at their points of attachment which form an angle with one another within a range of twenty degrees to forty degrees.

12. The apparatus as defined in claim 11, wherein the angle is approximately thirty degrees.

13. The apparatus as defined in claim 1, wherein the second end wall of the plenum chamber includes opposing interior and exterior surfaces, said apparatus further comprising a substantially cylindrical connecting member coupled to the exterior surface of said second end wall so as to surround and communicate with the second port and extend outwardly therefrom.

14. The apparatus as defined in claim 13, wherein the first end wall of the plenum chamber includes opposing interior and exterior surfaces, said apparatus further comprising a substantially cylindrical auger barrel holder coupled to the exterior surface of the first end wall so as to surround and communicate with the first auger barrel port and extend outwardly therefrom.

15. An air conveying apparatus, useable in combination with a pressurized air supply means and an elongate barrel having a discharge end, as part of a material conveying system, said apparatus comprising:
a frustoconical section having a wider end and a narrower end and being configured and dimensioned to surround some portion of the barrel such that the frustoconical section extends from its wider end toward the discharge end of the barrel to its narrower end, said narrower end being sufficiently larger than the discharge end of the barrel to enable said discharge end to protrude from said narrower end, wherein the wider end is configured to be disposed in fluidic communication with the air supply means for conveying the pressurized air through the frustoconical section in the form of a continuous annular stream of pressurized air surrounding the barrel and passing from the narrower end into an air movement path; and
a plenum chamber having at least one air receiving opening for receiving pressurized air from the air supply means, said plenum chamber comprising first and second opposing end walls and having first and second ports formed in the first and second end walls, respectively, said first port being dimensioned to enable sealed passage of the barrel therethrough, wherein the narrower end of the frustoconical section is coupled to the second end wall of the plenum chamber so as to surround and communicate with the second port.

16. The apparatus as defined in claim 15, wherein the cone is positioned to enable passage of the barrel through the first port and into the wider end of said cone such that the second port comprises substantially the only unclosed opening other than the air receiving opening for drawing the pressurized air through the cone into a continuous annular stream of pressurized air surrounding the barrel and discharge end which thereby passes from said second port into an air movement path such that any material discharged from said discharge end is carried by the enveloping stream of air along said air movement path.

17. The apparatus as defined in claim 15, wherein a rotational auger is disposed within the barrel and wherein the frustoconical section is configured and dimensioned to surround some portion of the barrel containing the auger.

18. The apparatus as defined in claim 15, wherein the narrower end of the frustoconical member is sufficiently larger than the discharge end of the barrel to enable said narrower end to be placed close enough to said discharge end to cause the continuous stream of pressurized air to envelop the discharge end of the barrel so as to carry particulate material discharged from said discharge end along the air movement path.

19. The apparatus as defined in claim 15, wherein the narrower end of the frustoconical section is sufficiently larger than the barrel and the auger to enable the barrel to extend entirely through the frustoconical section and protrude from said narrower end.

20. The apparatus as defined in claim 15, wherein the narrower end of the frustoconical section comprises a substantially uniform cylindrical member.

21. A method for producing a stream of air and conveying material within said stream of air, said method comprising the steps of:
  (a) placing the material into a barrel having a discharge end and transporting the material through the barrel toward and through the discharge end;
  (b) sliding a plenum chamber containing an air reduction cone and having first and second barrel ports onto the barrel such that said barrel extends through at least the first barrel port and into the air reduction cone, wherein said air reduction cone includes a first open end and a second narrower open end which is coupled to the plenum chamber so as to surround and communicate with the second barrel port;
  (c) injecting pressurized air into the plenum chamber at a pressure sufficient to convey the air along an air movement path extending into and through the reduction cone and out of the narrower open end of the cone to enable the cone to form the air into a continuous annular stream of pressurized air surrounding the barrel; and
  (d) positioning the narrower open end of the reduction cone sufficiently close to the discharge end of the barrel to cause the stream of the air to envelop said discharge end and carry material discharged from said discharge end along the air movement path.

22. The method as defined in claim 21, wherein step (a) further comprises feeding particulate material into an auger barrel and rotating an auger contained within the auger barrel so as to transport the material through the auger barrel toward and through the discharge end.

23. The method as defined in claim 21, further comprising the step of:
  (e) placing a first open end of a transport conduit into communication with the second barrel port such that the stream of air is received thereinto, said transport conduit being sufficiently larger in diameter than the narrower open end of the reduction cone to cause a reduction in the pressure of the air stream when it is received in said transport conduit.

24. The method as defined in claim 23, wherein step (e) further comprises selecting the transport conduit to be sufficiently larger in cross-sectional area than an annular constriction space formed between the reduction cone and the barrel such that subatmospheric pressure is produced in said transport conduit when the stream of pressurized air passes into said transport conduit.

25. The method as defined in claim 23, further comprising the step of:
  (f) intercoupling the transport conduit and the plenum chamber with a substantially cylindrical connecting member such that said connecting member surrounds member and communicates with the second auger barrel port and extends outwardly therefrom into contact with the transport conduit, wherein said connecting member is sufficiently larger in diameter than the narrower open end of the reduction cone to cause a first reduction in the pressure of the air stream and wherein the transport conduit is sufficiently larger in diameter than the connecting member to cause a second reduction in the pressure of the air stream.

26. The method as defined in claim 21, further comprising the step of:
  (g) slidably adjusting the position of the plenum chamber relative to the discharge end of the barrel.

27. The method as defined in claim 26, wherein step (g) further comprises observing discharge movement of the material from the discharge end of the barrel, and slidably adjusting the position of the plenum chamber relative to the discharge end of the barrel if said discharge movement is steeper than desired.

28. A system, useable in combination with an air supply means for supplying pressurized air, for conveying material from a first location to a second location, the system comprising:
  an elongate barrel having a first opening for receiving the particulate material thereinto and a discharge end for discharging the particulate material therefrom;
  moving means for moving the particulate material through the barrel and out of the discharge end;
  plenum chamber surrounding the barrel for receiving pressurized air from the air supply means, said plenum chamber having first and second opposing end walls and side walls extending between said first and second end walls, and further including first and second barrel ports formed in the first and second end walls, respectively, said barrel extending through the first port;
  a frustoconical air reduction cone having an open narrower end and an open wider end and being coupled at its narrower end to the second end wall of the plenum chamber such that the narrower end surrounds and communicates with the second barrel port, wherein said reduction cone surrounds the barrel so as to form the pressurized air into a continuous annular stream of pressurized air surrounding the barrel and passing from the open narrower end into an air movement path, said open narrower end being positioned sufficiently close to the discharge end of the barrel to cause the stream of the air to envelop said discharge end and carry particulate material discharged from said discharge end along the air movement path.

29. The system as defined in claim 28, wherein the moving means comprises a rotational auger disposed within the elongate barrel.

30. The system as defined in claim 29, further comprising:
   a hopper disposed in communication with the barrel and extending upwardly therefrom for holding particulate material therein, said hopper having a throat for channeling flow of the material into the barrel;
   valve means disposed in the throat of the hopper for selectively increasing and reducing the flow of the material into the barrel.

31. The system as defined in claim 28, wherein the reduction cone and the barrel form an annular constriction space therebetween when the barrel extends into the reduction cone and wherein the second end wall of the plenum chamber includes opposing interior and exterior surfaces, said apparatus further comprising a transport conduit coupled to the exterior surface of said second end wall so as to surround and communicate with the second barrel port for receiving the stream of pressurized air thereinto, said transport conduit being sufficiently larger in cross-sectional area than the annular constriction space such that subatmospheric pressure is produced in said transport conduit when the stream of pressurized air passes into said transport conduit.

32. The system as defined in claim 28, wherein the narrower end of the reduction cone is sufficiently larger than the discharge end of the auger barrel to enable said discharge end to protrude from said narrower end.

33. The system as defined in claim 28, wherein the system is useable in combination with a transport conduit, wherein the second end wall of the plenum chamber includes opposing interior and exterior surfaces, said system further comprising a substantially cylindrical connecting member having first and second open ends and being coupled at its first end to the exterior surface of said second end wall so as to surround and communicate with the second barrel port for receiving the stream of pressurized air thereinto, the second end of said connecting member being a free end configured for attachment and communication with the transport conduit, wherein said connecting member is sufficiently larger in diameter than the narrower open end of the reduction cone to cause a first reduction in the pressure of the air stream and wherein the connecting member is sufficiently smaller in diameter than the transport conduit to cause a second reduction in the pressure of the air stream.

* * * * *